United States Patent Office 3,389,986  
Patented June 25, 1968

3,389,986  
2,6-SUBSTITUTED CYCLOHEXANONES AS INSECTICIDES, MITICIDES, FUNGICIDES, NEMATOCIDES AND HERBICIDES  
Eugene P. Di Bella, Rochelle Park, N.J., assignor to Tenneco Chemicals, Inc., a corporation of Delaware  
No Drawing. Filed July 2, 1964, Ser. No. 380,049  
12 Claims. (Cl. 71—123)

ABSTRACT OF THE DISCLOSURE

The growth of undesirable insects, mites, fungi, nematodes, and plants is controlled by applying to the pests or to the locus in which control is to be effected a pesticidal amount of a 2,6-substituted cyclohexanone.

---

This invention relates to novel substituted cyclohexanones. More particularly it relates to cyclohexanones that have certain aromatic or heterocyclic groups in the 2 and 6 ring positions. It further relates to the use of these compounds in pesticidal compositions.

In accordance with this invention it has been discovered that certain 2,6-substituted cyclohexanones have unusual and valuable activity as insecticides, as miticides, as fungicides, as nematocides, and as herbicides. These compounds may be represented by the structure

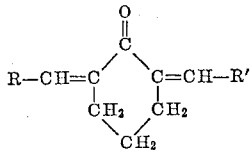

wherein R and R' each represents a substituted phenyl group, a styryl group, a 1,2,5,6-tetrahydrophenyl group, a naphthyl group, or a pyridyl group. The substituted phenyl groups that may be present include those having the structure

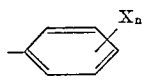

wherein X represents chloro, hydroxyl, nitro, lower alkyl, lower alkoxy, or di (lower alkyl) amino groups, and $n$ represents a number in the range of 1 to 3. Illustrative of these compounds are the following:

2,6-bis-(2-chlorobenzylidene)-cyclohexanone;  
2,6-bis-(4-chlorobenzylidene)-cyclohexanone;  
2,6-bis-(2,4-dichlorobenzylidene)-cyclohexanone;  
2,6-bis-(3,4-dichlorobenzylidene)-cyclohexanone;  
2,6-bis-(2,3,6-trichlorobenzylidene)-cyclohexanone;  
2,6-bis-(2,6-dichloro-3-methylbenzylidene)-cyclohexanone;  
2,6-bis-(2,6-dichloro-3-nitrobenzylidene)-cyclohexanone;  
2,6-bis-(4-methylbenzylidene)-cyclohexanone;  
2,6-bis-(4-butylbenzylidene)-cyclohexanone;  
2,6-bis-(3-nitrobenzylidene)-cyclohexanone;  
2,6-bis-(3,4-dinitrobenzylidene)-cyclohexanone;  
2,6-bis-(4-N,N-dimethylaminobenzylidene)-cyclohexanone;  
2,6-bis-(3,4-dimethoxybenzylidene)-cyclohexanone;  
2,6-bis-(4-hydroxybenzylidene)-cyclohexanone;  
2,6-bis-(1,2,5,6-tetrahydrobenzylidene)-cyclohexanone;  
2,6-dicinnamylidene-cyclohexanone;  
2,6-bis-(1-naphthylidene)-cyclohexanone;  
2,6-bis-(4-pyridylmethylene)-cyclohexanone; and the like.

These compounds may be prepared by any convenient procedure. Excellent results have been obtained by reacting cyclohexanone with the appropriate aldehyde under alkaline conditions and in the presence of a solvent, such as methanol or ethanol. The procedure by which this reaction may be carried out is illustrated by the following example.

EXAMPLE 1

To a mixture of 62 grams (0.354 mole) of 3,4-dichlorobenzaldehyde, 16 grams (0.16 mole) of cyclohexanone, and 300 ml. of methanol was added a solution of 16 grams of sodium hydroxide in 75 ml. of water. The reaction mixture was maintained at 35°–45° C. for 1 hour during which time a yellow precipitate formed. After filtration, the product was washed with water and then with methanol, and dried. There was obtained 60 grams of 2,6-bis-(3,4-dichlorobenzylidene)-cyclohexanone that melted at 147°–148° C. and that contained 35.3% Cl (calculated for $C_{20}H_{14}OCl_4$, 34.5% Cl).

Using the aforementioned procedure a series of 2,6-substituted cyclohexanones of this invention was prepared. The properties of these compounds are given in Table I.

TABLE I

| Compound | Melting Point, °C. | Analysis | |
|---|---|---|---|
| | | Percent Found | Percent Calculated |
| 2,6-bis (2-chlorobenzylidene)-cyclohexanone | 109–110 | 21.0 Cl | 20.7 Cl. |
| 2,6-bis (4-chlorobenzylidene)-cyclohexanone | 146–149 | 20.2 Cl | 20.7 Cl. |
| 2,6-bis (2,4-dichlorobenzylidene)-cyclohexanone. | 162 | 34.5 Cl | 34.5 Cl. |
| 2,6-bis (3,4-dichlorobenzylidene)-cyclohexanone. | 147–148 | 35.3 Cl | 34.5 Cl. |
| 2,6-bis (4-methylbenzylidene)-cyclohexanone. | 164–166 | 87.0 C; 7.24 H | 87.4 C; 7.29 H. |
| 2,6-bis (4-methoxybenzylidene)-cyclohexanone. | 157–162 | 78.8 C; 6.49 H | 79.1 C; 6.59 H. |
| 2,6-bis (3,4-dimethoxybenzylidene)-cyclohexanone. | 143–145 | 71.5 C; 6.36 H | 73.1 C; 6.61 H. |
| 2,6-bis (4-hydroxybenzylidene)-cyclohexanone.* | 166–168 | 74.0 C; 6.04 H | 78.4 C; 5.89 H. |
| 2,6-bis (3-nitrobenzylidene)-cyclohexanone | 189–191 | 7.0 N | 7.7. N. |
| 2,6-bis (4-nitrobenzylidene)-cyclohexanone | 200–203 | 7.5 N | 7.7 N. |
| 2,6-bis (4-N, N-dimethylaminobenyzlidene)-cyclohexanone | >300 | 7.7 N | 7.8 N. |
| 2,6-bis (1,2,5,6-tetrahydrobenzylidene)-cyclohexanone. | Oil | 82.8 C; 9.23 H | 85.1 C; 9.22 H. |
| 2,6-dicinnamylidene-cyclohexanone | 178–180 | 83.1 C; 6.16 H | 88.3 C; 6.75 H. |
| 2,6-bis (1-naphthylidene) cyclohexanone | 194–205 | 89.0 C; 5.80 H | 89.9 C; 5.88 H. |
| 2,6-bis (4-pyridylmethylene) cyclohexanone | 115–120 | 6.66 N | 10.1 N. |

*This compound was prepared by hydrolizing 2,6-bis (4-methoxybenzylidene) cyclohexanone with hydrogen iodide.

The compounds of the present invention may be applied to a wide variety of insect, mite, fungus, and plant pests to control or inhibit their growth. While each of these compounds has been found to be useful in the control of the growth of certain of the aforementioned pests, the particular type of pesticidal organism upon which each exerts its major effect is largely dependent upon the nature of the substituents in the 2 and 6 positions of the cyclohexanone. Thus, it has been found that 2,6-bis (3,4-dichlorobenzylidene)-cyclohexanone and 2,6- bis (4-methoxybenzylidene) cyclohexanone are particularly valuable as selective herbicides, while 2,6-bis (1-naphthylidene) cyclohexanone and 2,6-dicinnamylidene cyclohexanone are most effective as nematocides, 2,6-bis (4-methylbenzylidene) cyclohexanone and 2,6-bis (4-pyridylmethylene) cyclohexanone as agricultural fungicides, and 2,6-bis (2-chlorobenzylidene) cyclohexanone, 2,6-bis (4-chlorobenzylidene) cyclohexanone, and 2,6-bis (4-hydroxybenzylidene) cyclohexanone as insecticides.

The locus in which pest control is to be effected may if desired be treated with the compounds of this invention. It is generally preferred, however, that these compounds be applied directly to the undesirable organisms to control or inhibit their growth.

While the 2,6-substituted cyclohexanones may be used as such in the process of the present invention, they are usually and preferably used in combination with an inert carrier which facilitates the dispensing of dosage quantities of the pesticide and assists in its absorption by the organism whose growth is to be controlled. The pesticidal compounds may be mixed with or deposited upon inert particulate solids, such as fuller's earth, talc, diatomaceous earth, hydrated calcium silicate, kaolin, and the like, to form dry particulate compositions. Such compositions may if desired be dispersed in water with or without the aid of a surface-active agent. The pesticidal compounds are preferably dispensed in the form of solutions or dispersions in inert organic solvents, water, or mixtures of inert organic solvents and water, or as oil-in-water emulsions. The concentration of the 2,6-substituted cyclohexanones in the herbicidal compositions may vary within wide limits and depends upon a number of factors, the most important of which are the type or types of undesirable organisms being treated and the amount of the composition to be applied per unit of area. If desired, mixtures of two or more of the novel compounds as well as other pesticidal compounds may be present in the compositions.

The use of the novel 2,6-substituted cyclohexanone in the control of various organisms is demonstrated in the following examples.

EXAMPLE 2

Groups of greenhouse flats containing soil were planted with seeds of various crop and weed species. Two to four weeks after planting the plants were sprayed with a 0.3% aqueous suspension of one of the compounds of this invention. The amount of the suspension used was such as to apply the compound at a rate equivalent to 10 pounds per acre. In each case the results were observed 2 weeks after the application of the herbicidal composition.

In Table II the effectiveness of the herbicidal compounds, as determined by comparison with untreated plantings, is indicated by the numbers "0" through "10" in increasing order of effectiveness. Thus "0" indicates no herbicidal activity; "1"–"3," slight injury; "4"–"6," moderate injury; "7"–"9," severe injury; and "10," destruction of all plants.

TABLE II

| Plant Species | 2,6-bis (2,4-dichlorobenzylidene) cyclohexanone | 2,6-bis (3,4-dichlorobenzylidene) cyclohexanone |
|---|---|---|
| Corn | 0 | 2 |
| Wheat | 4 | 2 |
| Oats | 4 | 1 |
| Soybeans | 2 | 10 |
| Clover | 4 | 5 |
| Onions | 2 | 8 |
| Foxtail | 1 | 8 |
| Ryegrass | 5 | 2 |
| Crabgrass | 4 | 10 |
| Mustard | 2 | 4 |
| Buckwheat | 0 | 10 |
| Morning Glory | 0 | 10 |

| Plant Species | 2,6-bis (4-methoxybenzylidene) cyclohexanone | 2,6-bis (4-nitro-benzylidene) cyclohexanone |
|---|---|---|
| Corn | 0 | 0 |
| Wheat | 2 | 4 |
| Oats | 0 | 2 |
| Soybeans | 8 | 5 |
| Clover | 8 | 4 |
| Onions | 0 | 0 |
| Foxtail | 0 | 0 |
| Ryegrass | 2 | 0 |
| Crabgrass | 0 | 0 |
| Mustard | 8 | 5 |
| Buckwheat | 10 | 0 |
| Morning Glory | 8 | 4 |

EXAMPLE 3

Two of the compounds of this invention were evaluated as nematocides by the following procedure: The test compounds were uniformly mixed with soil containing eggs and knots of the root-knot organism, *Meloidogyne incognita*. Single-eye seed pieces of presprouted potatoes were then transplanted to the treated soil. When significant evidence of nematode development was detectable in the untreated controls by soil surface knots and/or knots on the root system, the treated plants were observed for comparative root knot development. The percentage of root-knot control is calculated from the number of knots present on the treated plants and on the untreated controls.

In Table III are given data on the effectiveness of two of the 2,6-substituted cyclohexanones of this invention as nematocides. For comparative purposes data on a commercial nematocide are included in this table.

TABLE III

| Compound | Conc. (p.p.m.) | Percent Root Knot Control 34 Days After Treatment | Plant Injury |
|---|---|---|---|
| 2,6-bis-(1-naphthylidene) cyclohexanone | 100 | 50.0 | None. |
| 2,6-dicinnamylidene-cyclohexanone | 100 | 84.0 | Do. |
| 1,3-dichloropropene (marketed as Telone by Dow Chemical Co.) | 100 | 50.0 | Moderate. |
| 1,3-dichloropropene | 50 | 0 | None. |

EXAMPLE 4

In a series of experiments in which the compounds were applied at the rate of 1000 p.p.m. to plants infested with pea aphids, the following compounds showed substantial insecticidal activity:

2,6-bis-(2-chlorobenzylidene)cyclohexanone
2,6-bis-(4-chlorobenzylidene)cyclohexanone
2,6-bis-(4-methylbenzylidene)cyclohexanone
2,6-bis-(4-hydroxybenzylidene)cyclohexanone
2,6-bis-(4-pyridylmethylene)cyclohexanone

What is claimed is:
1. The method of controlling the growth of undesirable plants which comprises contacting said plants with an effective amount of 2,6-bis (4-methylbenzylidene)-cyclohexanone.
2. The method of controlling the growth of undesirable plants which comprises contacting said plants with an effective amount of 2,6-bis (4-methoxybenzylidene)-cyclohexanone.

3. The method of controlling the growth of undesirable plants which comprises contacting said plants with an effective amount of 2,6-dicinnamylidene-cyclohexanone.

4. The method of controlling the growth of undesirable plants which comprises contacting said plants with an effective amount of 2,6-bis (1-naphthylidene)-cyclohexanone.

5. The method of controlling the growth of undesirable insects, mites, fungi and nematodes which comprises treating the locus wherein said control is to be effected with a pesticidal amount of 2,6-bis(4-methylbenzylidene)-cyclohexanone.

6. The method of controlling the growth of undesirable insects, mites, fungi and nematodes which comprises treating the locus wherein said control is to be effected with a pesticidal amount of 2,6-bis(4-methoxybenzylidene)-cyclohexanone.

7. The method of controlling the growth of undesirable insects, mites, fungi and nematodes which comprises treating the locus wherein said control is to be effected with a pesticidal amount of 2,6-dicinnamylidene-cyclohexanone.

8. The method of controlling the growth of undesirable insects, mites, fungi and nematodes which comprises treating the locus wherein said control is to be effected with a pesticidal amount of 2,6-bis(1-naphthylidene)-cyclohexanone.

9. The method of controlling the growth of undesirable insects, mites, fungi and nematodes which comprises contacting said pests with a pesticidal amount of 2,6-bis(4-methylbenzylidene)-cyclohexanone.

10. The method of controlling the growth of undesirable insects, mites, fungi and nematodes which comprises contacting said pests with a pesticidal amount of 2,6-bis(4-methoxybenzylidene)-cyclohexanone.

11. The method of controlling the growth of undesirable insects, mites, fungi and nematodes which comprises contacting said pests with a pesticidal amount of 2,6-dicinnamylidene-cyclohexanone.

12. The method of controlling the growth of undesirable insects, mites, fungi and nematodes which comprises contacting said pests with a pesticidal amount of 2,6-bis-(1-naphthylidene)-cyclohexanone.

References Cited

UNITED STATES PATENTS

| 2,465,855 | 3/1949 | Dorman et al. | 260—590 X |
| 2,492,334 | 12/1949 | Thompson | 260—590 X |
| 2,839,584 | 6/1958 | Garber | 260—590 X |
| 3,273,992 | 9/1966 | Treves et al. | 71—2.3 |

FOREIGN PATENTS 1,160,689  3/1958  France.

OTHER REFERENCES

Chemical Abstracts 19:1266[3], (1925).
Chemical Abstracts 35:2865[4], (1941).
Chemical Abstracts 47:6292–6293, (1953).
Chemical Abstracts 50:4846c, (1956).
Chemical Abstracts 50:12891, (1956).
Huitric et al., Antibiotics & Chemotherapy, Vol. 6, No. 6, pp. 290–293, April 1956.
Chemical Abstracts 51:17917g, (1957).
Chemical Abstracts 55:21091g, (1961).

ALBERT T. MEYERS, *Primary Examiner.*

VERA C. CLARKE, *Assistant Examiner.*